Figure 1A:
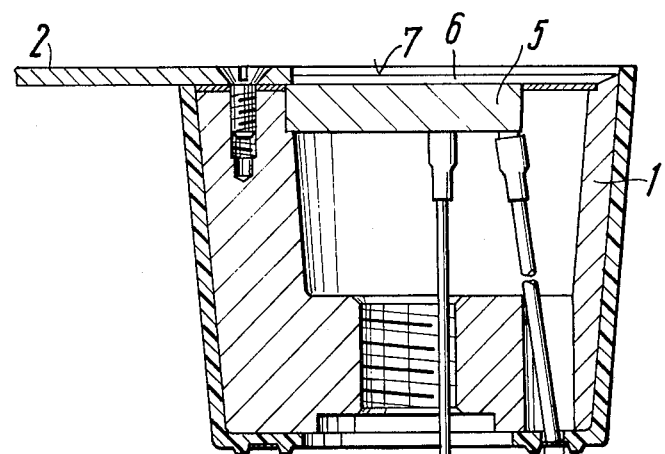

United States Patent [19]
Ladewig

[11] 3,876,977
[45] Apr. 8, 1975

[54] PROXIMITY SWITCH ARRANGEMENT FOR HORN CIRCUIT IN STEERING WHEEL

[75] Inventor: Wolfgang Ladewig, Aschaffenburg, Germany

[73] Assignee: Lenkradwerk Gustav Petri Aktiengesellschaft, Aschaffenburg, Germany

[22] Filed: May 29, 1973

[21] Appl. No.: 364,541

[30] Foreign Application Priority Data
July 25, 1972 Germany.............................. 2236351

[52] U.S. Cl.................. 340/135; 340/88; 340/365 C
[51] Int. Cl............................................... B60q 5/00
[58] Field of Search........... 340/88, 384 E, 388, 402, 340/258 A, 258 B, 365 C, 75, 135, 279; 180/99

[56] References Cited
UNITED STATES PATENTS

| | | | |
|---|---|---|---|
| 3,177,481 | 4/1965 | Joy et al. | 180/99 |
| 3,397,348 | 8/1968 | Hoeppel | 340/384 E |
| 3,493,966 | 2/1970 | Human | 340/384 E |
| 3,641,410 | 2/1972 | Vogelsberg | 340/365 C |
| 3,696,409 | 10/1972 | Braaten | 340/365 C |

*Primary Examiner*—John W. Caldwell
*Assistant Examiner*—Marshall M. Curtis
*Attorney, Agent, or Firm*—Joseph A. Geiger

[57] ABSTRACT

A signalling device for a motor vehicle, consisting of a horn or lamp and a contactless (touch-type) signal initiator mounted on or near the steering wheel. The initiator may be of the capacitive or inductive form, and may be slightly recessed into a spoke or the rim of the vehicle steering wheel.

7 Claims, 5 Drawing Figures

PROXIMITY SWITCH ARRANGEMENT FOR HORN CIRCUIT IN STEERING WHEEL

The invention relates to a signalling device for automotive vehicles.

Some signalling devices for automotive vehicles have hitherto consisted of either a signal emitter such as a hooter, or a light bulb as a light emitter, which is actuated by a contact on the steering wheel, a signal button, a signal strip or a signal ring. Known signalling devices have generally proved to be satisfactorily functional. But the expenditure occurring during assembly of a plurality of components, and the necessity of mounting an open rigid signal ring or bar of fairly large surface area, is a disadvantage. The exposed rigid operative members have frequently been the cause of injuries in traffic accidents.

It is an object of the present invention to provide a signal initiating device for automotive vehicles which is easy to assemble or mount, and which eliminates the risk of injury. The invention consists in that the signal release is formed by an impulse initiator.

It has been found that the use of contactless signal initiators can be used to actuate optical or acoustic signalling means in automotive vehicles, without accidental signalling occurring, which could be expected in view of the high degree of sensitivity of such initiators. Such initiators are structural units having no movable parts and are consequently simple to assemble, reliable in operation and substantially without wear and tear. Separate push button controls are not required. The risk of accident injury occurring with known signalling devices are avoided, since the steering wheel forms an integral whole and thereby provides better absorption of impact forces. They permit the construction of a steering wheel without slot or gap to be produced, imparting to the wheel a better appearance from the stylistic point of view. They require a very low finger pressure and hence afford the possibility of mounting the initiator in the centre of the steering wheel.

A capacitive initiator or sensor may be provided, accommodated in a deep recess of the steering wheel or in any other component of the automotive vehicle. This recess prevents accidental signalling due to the approach of a metal or non-metal object. It is, however, also possible for the initiator to be located in a shallow recess which has a resilient cover. Accidental signalling due to approach of the hand or a finger is also eliminated in this case. Signalling is effected with small effort by gently depressing the resilient cover.

It is also possible to provide an inductive initiator or sensor having an electrically conductive back plate which may be made of foil, a metal-evaporated plastics material plate or the like. The two parts are mounted independently of one another, each individually manufacturable together with another part, or mounted during the production of another structural member. Thus, the metal backing plate may be incorporated in the foam material of conventional steering wheel padding. It is also possible for the initiator to be located in the steering wheel boss, or any other part. Moreover the signal release is concealed or sunken and does not impair the appearance of the steering wheel. The initiator and the electrically conductive backing plate may have any suitable shape, so that the signalling device may conform to any requirement of shape. The initiator may be formed as a rod, plate, forked or ring element. It may also be located in the same place and manner as conventional signal initiator (signal ring or signal bar) and hence provide signalling in any position of the steering wheel.

Figure 1B:
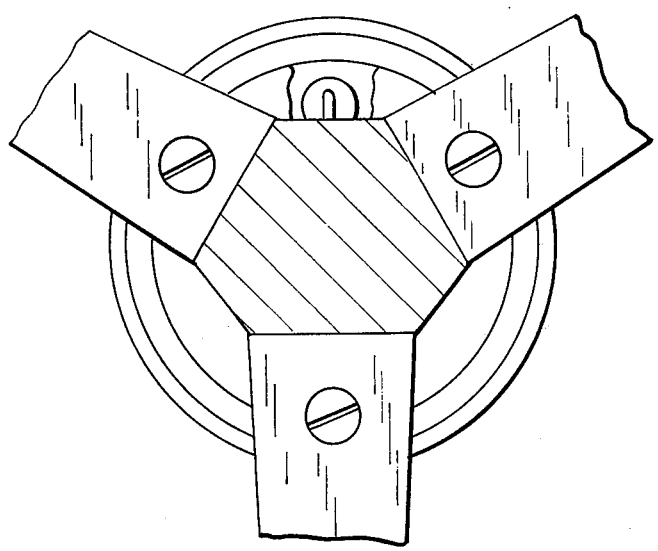
Figure 2A:
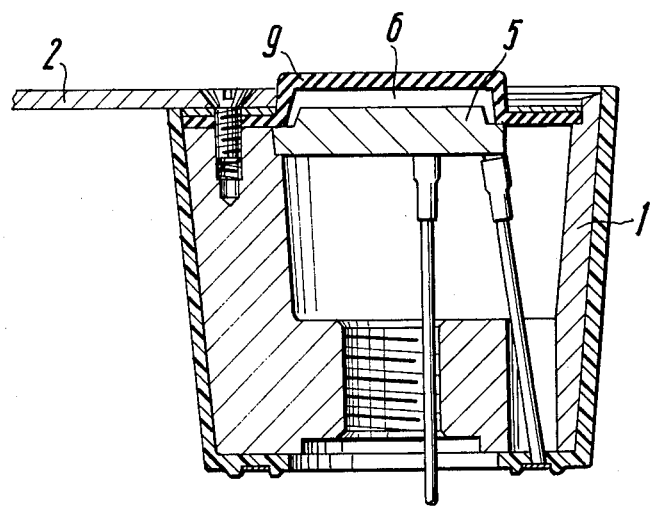
Figure 2B:
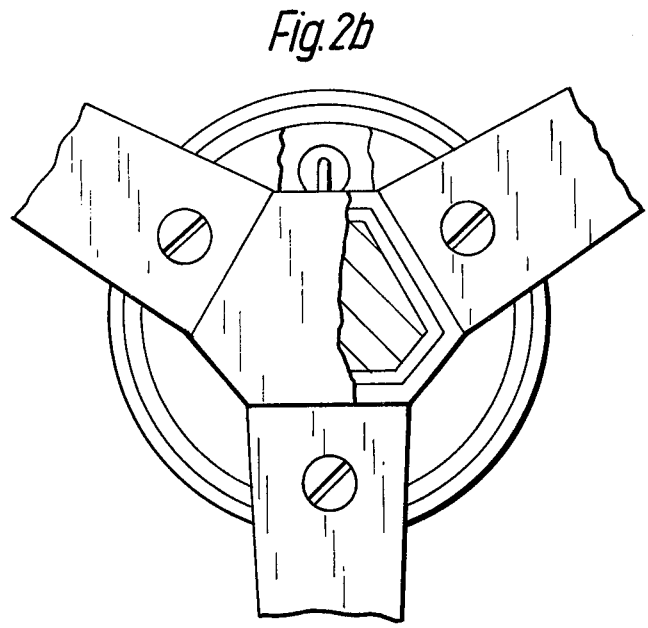
Figure 3:
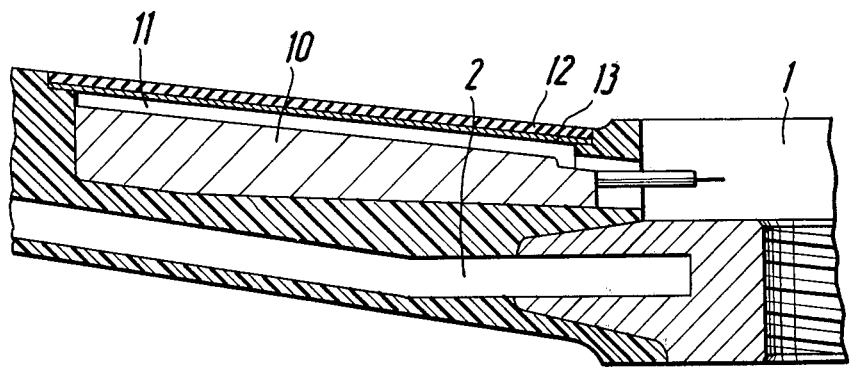

The invention is shown by way of example in the accompanying drawings, in which:

FIGS. 1a and 1b show, in cross section and end view, respectively, a portion of a steering wheel having a signal actuator for a signalling device, FIGS. 2a and 2b are similar views of an alternative embodiment of a steering wheel boss with a signal actuator, and FIG. 3 is a section through a steering wheel in the region of the spokes with a further form of signal actuator.

In FIG. 1 the numeral 1 denotes a steering wheel boss and 2 a steering wheel spoke of an automotive vehicle. The signalling device concerned comprises a signal emitter, such as a lamp 3, which is supplied with current from a direct current source 4 and mounted within reach from the driving seat, preferably on the steering wheel or close to the steering column.

An impulse initiator is provided as a signal actuator which in the embodiment shown in FIG. 1 is a capacity initiator or sensor, which is mounted in the base of a deep recess 6 of the steering wheel boss 1. The deep or recessed mounting of the sensor prevents accidental signalling if the driver's hand is moved unavoidably over the recess opening during steering. A quick and reliable signalling action is not prevented by this, since it is only necessary for a finger to be inserted to a shallow depth in the boss opening until the "sensitivity" plane located substantially at 7 is reached. Pressure application, or the use of a specific object as an opposite electrode, is not required. The numeral 8 denotes a contact such as the ignition switch of the automotive vehicle, which is connected in the circuit so as to prevent signal initiation and enable servicing such as a cleaning operation to be carried out on the steering wheel.

The embodiment shown in FIG. 2 is similar to that of FIG. 1 with the difference that the capacitive sensor 5 is in this case located higher up in the boss opening 6, and to prevent any accidental signalling, the boss recess 6 is enclosed by a cover 9. The cover may consist of any resilient material such as leather, plastics material, rubber or metal. It forms an opposite electrode to the sensor. Initiation of a signal is effected by depressing the resilient cover.

In the embodiment shown in FIG. 3 an inductive sensor 10 is provided as a signal initiator. It has a cylindrical shape and is accommodated in the spoke 2 of the steering wheel. For this purpose the spoke has a recess 11 formed therein which is closed by a cover 12 the surface of which facing the sensor 10 is provided with a metal coating 13, such as a coating of aluminum foil.

This embodiment has a signal initiating bar located in the spoke of the steering wheel. This arrangement has the advantages of being substantially less dangerous during accidents, and providing easier signalling, inasmuch as the pressure required for signalling is the same at any part of the spoke of the steering wheel, whilst in known signal-bar actuated signalling devices the pressure depends upon the distance to the point of suspension of the signal bar, which consequently can be actuated only by an appreciable force at certain parts thereof.

The sensor, in the case of certain steering wheel designs, may be bifurcated or annular, so as to conform to the requirements of the shape of the wheel in which it is fitted.

I claim:

1. In the steering wheel of an automobile, a switch arrangement for the horn circuit of the automobile comprising in combination:
    a recess in a portion of the steering wheel, the open end of the recess being oriented toward the driver; and
    a proximity switch arranged inside said recess, the switch having a sensitive, substantially flat face recessed a short distance from the surrounding structure of the steering wheel.

2. A switch arrangement as defined in claim 1 wherein:
    the recess is located centrally in the steering wheel; and
    the proximity switch is a capacitive, contactless switch responding to the presence of a finger in the proximity of its sensitive face.

3. A switch arrangement as defined in claim 2, further comprising:
    a thin, resiliently depressible cover positioned at such a distance above the sensitive face of the proximity switch that, in addition to the presence of a finger, a slight depression toward said face is required to actuate the switch.

4. A switch arrangement as defined in claim 3, wherein the cover is of plastic material and arranged on the steering wheel so as to define a protrusion over the surrounding wheel structure.

5. A switch arrangement as defined in claim 1, wherein:
    the proximity switch is of the inductive type; and
    the switch arrangement further comprises a resilient cover member having a conductive surface located substantially in parallel and at a distance from the sensitive face of the switch, the cover member being depressible toward said face to actuate the switch.

6. A switch arrangement as defined in claim 5, wherein:
    the recess is located centrally in the steering wheel;
    the cover member is a resiliently depressible plastic cap having a metallic coating on its side facing the inductive proximity switch.

7. A switch arrangement as defined in claim 5, wherein
    the recess is located in a spoke of the steering wheel;
    the inductive proximity switch is a rod shaped body; and
    the cover member has an outer surface defining a portion of a continuous, smooth spoke outline.

* * * * *